UNITED STATES PATENT OFFICE.

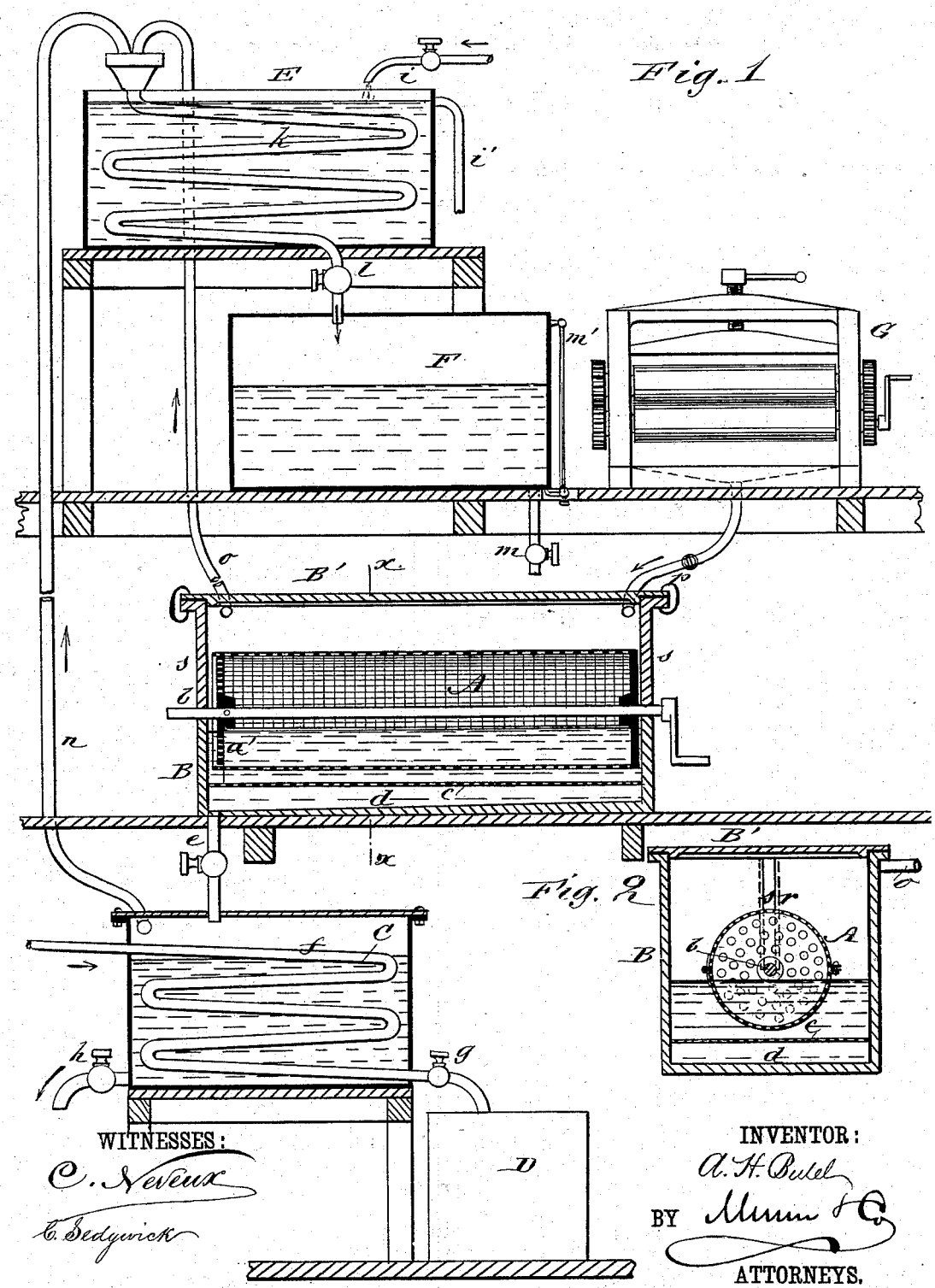

ALEXANDER H. BUTEL, OF BRIDGEPORT, CONNECTICUT, ASSIGNOR OF ONE-HALF TO ROBERT W. FRYER, OF INDEPENDENCE, IOWA.

APPARATUS FOR EXTRACTING GREASE FROM WOOL.

SPECIFICATION forming part of Letters Patent No. 276,349, dated April 24, 1883.

Application filed January 22, 1883. (No model.)

*To all whom it may concern:*

Be it known that I, ALEXANDER HENRY BUTEL, of Bridgeport, in the county of Fairfield and State of Connecticut, have invented certain new and useful Improvements in Apparatus for Extracting Grease from Wool, and for other Purposes, of which the following is a full, clear, and exact description.

This invention, although applicable to the extraction of oil or grease from various animal and other fibrous substances, and to the cleansing or bleaching of the same, is more particularly designed for extracting the yolk or grease from wool, and relates to apparatus and processes for such purposes, in which the material to be treated is washed, under cover, with liquid hydrocarbon or other suitable solvent or bleaching-liquid. The oil or grease extracted is separately collected, and the volatile matter is passed through a still for use over again in a continuous manner.

The invention consists in an apparatus for such purpose or purposes of novel construction, and in certain details thereof, the same comprising a washing-machine, a still and a condenser connected therewith, an oil-tank, and a wringing-machine, substantially as hereinafter described, and whereby the results sought to be attained are very perfectly secured.

Reference is to be had to the accompanying drawings, forming a part of this specification, in which similar letters of reference indicate corresponding parts in both the figures.

Figure 1 represents a partly-sectional elevation of an apparatus embodying my invention; and Fig. 2 a transverse section, on the line *x x* in Fig. 1, of the washing portion of said apparatus.

A in the drawings indicates a reticulated cylinder or wire cage fitted upon a horizontal shaft, *b*, and made to open and close for reception within it and withdrawal therefrom of the wool or other material to be treated. This cage, which forms part of the washing-machine or washing portion of the apparatus, is arranged to rotate, either by hand or by any suitable machinery, horizontally within a tank, B, which may be made of wood lined with zinc, tin, lead, or other suitable material. Said tank is provided with a removable top, B', that virtually forms part of it, and is secured to the tank proper or body portion, B, by a luted or other joint, to form a close tank or vessel. It also has fitted within it a perforated false bottom, *c*, below the cage A, that serves as a strainer of any escaping fiber, and the main or close bottom *d*, below this again, is made sloping toward a liquid-discharge pipe, *e*. This discharge-pipe connects with a still, C, which is constructed to form a hermetically-closed receptacle, and is fitted with an inner steam-pipe or worm, *f*, through which steam is circulated, and from which the water of condensation on opening a cock, *g*, is run off into any suitable receiver, D. The body of the still is also provided with a draw-off cock, *h*, for the contents thereof. E is a condenser, which is a vat filled with running water by a pipe, *i*, that operates in connection with an overflow-pipe, *i'*. In this vat is placed a coil of pipe or worm, *k*, that discharges, subject to control by a cock, *l*, into a close oil tank or receiver, F, which is provided with a draw-off cock, *m*, and with a gage, *m'*, for determining the amount of liquid in said tank F. The still C, which occupies a lowermost position relatively to the condenser E, and the tank B, which occupies an intermediate position between the still and condenser, are both provided with pipes *n o*, which connect at their upper ends with and deliver into the worm *k* of the condenser.

G is a wringing-machine of any suitable construction, and which is provided with a return liquid-pipe, P, that returns liquid from the wringer to the washing-machine or tank B thereof.

The tank B is constructed at either end with an upper slot or groove, *r*, which may be closed by a filling-piece, *s*, and which serves to admit of the cage A, with its shaft *b*, being raised and withdrawn for the purpose of emptying the cage of its contents upon removing the top B' for the purpose. The cage A may be made in longitudinal half-sections hinged and fastened together, as shown in Fig. 2, to provide for filling and emptying it, as required. Furthermore, said cage A is fitted at its one end with a perforated disk, *a'*, made capable of being slid along the shaft *b* for the purpose of squeezing or pressing out liquid contained in the wool or other material in the cage before the removal of the cage with its contents from the tank. The object of this is to prevent loss by evaporation of the liquid with which the tank is supplied. Instead of the disk or end piece, $a'$, being fitted to slide on the shaft $b'$, it may be attached to said shaft, and the shaft be fitted to slide through the opposite end of the cage.

The wool or other material to be cleaned is first placed in the cage A, which is then fastened and lowered into the tank B. Said tank is then supplied to within a short distance below the shaft $b$ with liquid hydrocarbon or other suitable solvent or cleansing-liquid, and the cage and its contents are rotated. This exposes the whole of the material to the action of the liquid at each revolution of the cage, and when there is reason to believe that the material has been sufficiently washed the cage is drawn up by means of pulley devices or other suitable apparatus clear of the liquid contained in the tank B, and the disk $a'$ at the one end of the cage is drawn or pushed by any suitable means toward the opposite end, thus subjecting the washed material to a certain pressure by reducing the space occupied by it within the cage, and causing most of the liquid that adheres to the material to fall back into the closed tank, thereby preventing loss of liquid by evaporation. After the wool or other material has been thus sufficiently drained, the top B' of the tank B is removed, and the cage A drawn up or out and its contents delivered down a chute or otherwise to the wringing-machine G, through which the washed material is passed, and the same afterward spread out and exposed to a current of air and turned over from time to time until completely and sufficiently dried and deodorized. The liquid which is drained from the wringer G is passed by the pipe $p$ back into the tank B, and which liquid contains any grease or oily matter originally contained in the raw or fibrous material under treatment and held in suspension or solution. This liquid is then drawn off from the tank B by the pipe $e$, on opening a faucet therein for the purpose, and run into the still C, where, by means of the steam or other heating pipe $f$, the volatile oils are evaporated, leaving in the still the grease or heavy oils, which are then run off into the receiver D and washed in boiling water, allowed to settle, and afterward skimmed or run off from the surface of the water. The volatile oils which are evaporated within the still rise by means of the pipe $n$ for circulation through the worm $k$ of the condenser E, and any volatile matter within the tank may also be similarly delivered by the pipe $o$. From the condenser the condensed volatile oils are passed through the cock $l$ into the oil-tank F, for use over again.

It will thus be seen that loss by evaporation is effectually prevented, a rapid and perfect washing is given to the raw material, and all grease or oils contained therein are saved.

Having thus described my invention, I claim as new and desire to secure by Letters Patent—

1. In apparatus for extracting grease from wool and for cleaning animal and other fibrous substances by means of liquid hydrocarbons or other suitable solvents in closed vessels, the combination of a close tank containing the solvent, and a rotating cage containing the material to be treated, a still connected with said tank, a condenser connected with said still, and a wringer for the washed material, substantially as specified.

2. The combination of the washing-tank B, provided with a close lid or cover, B', the removable reticulated cylinder or cage A, the still C, with its worm $f$ and pipe $e$, connecting it with the tank, provided with a stop-cock or faucet, the condenser E, with its worm $k$, the pipes $n$ $o$, connecting said still and tank with the condenser, the close receiving oil-tank F, also connected with the condenser, and the wringer G, connected by a drainage-pipe with the tank B, all for operation in relation with each other, essentially as described, and for the purposes herein set forth.

3. In combination with the washing-tank B, the rotating reticulated cylinder or cage A, having a disk, $a'$, or one of its ends made movable toward the opposite end of the cage for compression of the material within the cage, essentially as and for the purpose specified.

4. The washing-tank B, provided with a perforated false bottom, $c$, in combination with the rotating reticulated cylinder or cage A, substantially as described.

ALEXANDER H. BUTEL.

Witnesses:
CHARLES SHERWOOD,
AMOS S. TREAT.